J. B. BAXTER.
SNAP HOOK.
APPLICATION FILED MAR. 1, 1911.
1,047,150.
Patented Dec. 17, 1912.
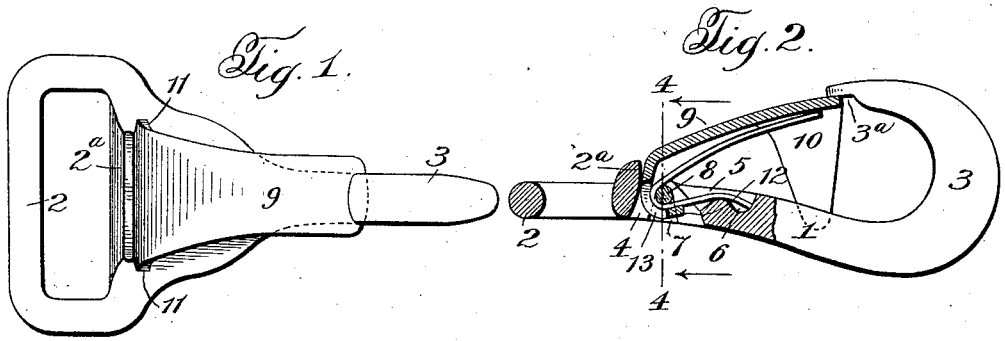
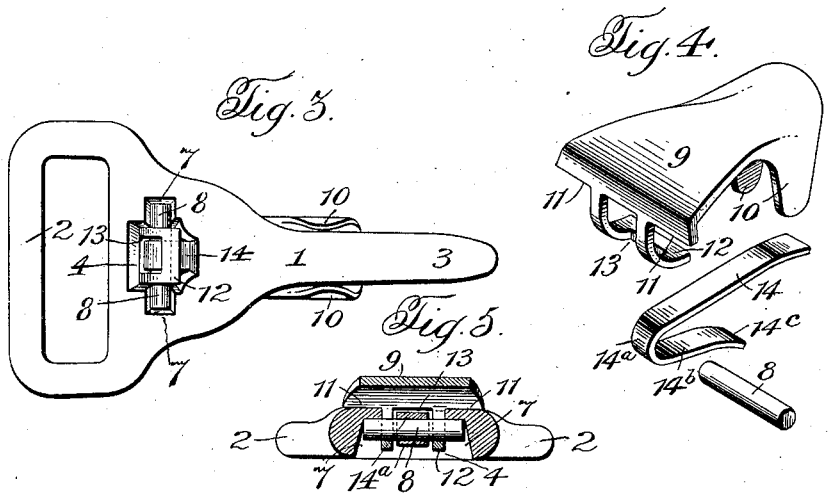
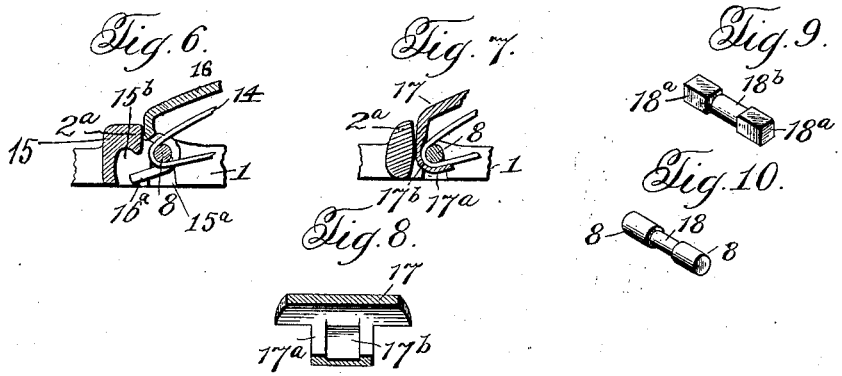
Witnesses:
Jas. E. Hutchinson
Calvin T. Milans
Inventor:
John B. Baxter,
By —— Williams
Attorneys

UNITED STATES PATENT OFFICE.

JOHN BROWN BAXTER, OF WATERVLIET, NEW YORK, ASSIGNOR TO COVERT MANUFACTURING COMPANY, OF WATERVLIET, NEW YORK, A CORPORATION OF NEW YORK.

SNAP-HOOK.

1,047,150.  Specification of Letters Patent.  Patented Dec. 17, 1912.

Application filed March 1, 1911. Serial No. 611,676.

*To all whom it may concern:*

Be it known that I, JOHN B. BAXTER, a citizen of the United States, residing at Watervliet, in the county of Albany and State of New York, have invented certain new and useful Improvements in Snap-Hooks, of which the following is a specification, reference being had therein to the accompanying drawing.

This invention relates to snap hooks of the type employing a hook member proper, and a coöperating pivoted tongue, and the present improvements have to deal more particularly with certain improvements in the construction of, and manner of assembling the parts, thereby rendering the hook more cheap to produce and more effective and durable in use.

The invention includes as one of its important features a novel form of bearing for the tongue member and further a novel means of attachment for the said bearing.

Again the invention contemplates a bearing for the tongue which may be of independent construction relative to both the hook and tongue, thereby making possible a bearing for the tongue which is easily produced and may be formed of relatively hard and durable metal, and which said bearing will present a smooth bearing surface for the tongue.

Also the present invention makes possible the removal and replacement of the bearing and other parts of the hook as occasion demands and the bearing for the tongue is, in effect, an anti-friction one.

Also the invention embraces an improved form of bearing for the spring usually interposed between the hook and tongue, when said spring takes the form of a U-shape.

More particularly the invention includes a hook, a tongue, an interposed spring, and a common bearing for the spring and tongue which said parts are all removable, and whereby a part carried by the tongue is conveniently utilized as the securing or retaining medium for the bearing.

Other improvements and certain novel details in the construction and arrangement of the parts will be more particularly brought out hereinafter, and for a clear understanding of the invention attention is directed to the accompanying drawings, which form a part hereof, and wherein I have disclosed, for the purpose of illustration a convenient and satisfactory embodiment of the invention.

In the drawings: Figure 1 is a top plan view, Fig. 2 is a side elevation partly in section, Fig. 3 is a bottom plan view, Fig. 4 is a detail perspective view of the tongue, spring, and bearing bar detached, Fig. 5 is a transverse section showing the pivot bar tongue and spring in position on the hook, Fig. 6 is a slight modification showing a different method of applying the tail of the tongue to the hook, Figs. 7 and 8 are detail views showing a slight modified construction of the end of the tongue, and Figs. 9 and 10 are detailed perspective views of different forms of pivot bars.

With more particular reference to the drawings, wherein like reference characters refer to corresponding parts throughout the several views a body part 1 is provided the same conveniently having at one end a loop extension 2 adapted for the reception of the usual coupling member such as a ring, and the said body portion terminating at its forward end in a return curved portion 3 constituting a hook part proper which latter has the usual recess $3^a$ in the under surface of its end adapted for the reception of the forward end of the tongue member to be later described. The forward wall $2^a$ of the loop member which may also be said to constitute the rear wall of the body part is raised so as to constitute an upright shoulder against which the rear end of the tongue, about to be described, may bear in the normal position of the tongue. The body portion of the hook member has an opening 4 therethrough, while the inner surface of the body part has a relatively shallow recess 5 connecting with a somewhat deeper recess 6, thereby forming a shoulder between the recesses behind which or over which the end of the spring member, to be described, engages. The rear surface of the hook member has oppositely disposed recesses 7 to opposite sides of and conveniently intermediate of the ends of the opening 4, which said recesses 7 constitute a seat or bearing member for the bearing member proper. The said bearing member is indicated by the numeral 8 and preferably comprises a bar or rod round in cross section and which may be made of hardened steel or other suitable metal. This bearing member is adapted to loosely lie within the seat provided by the recesses 7 whereby it may have a rolling action, and whereby the same may be inserted and removed by a transverse movement into and out of the seat. Since the bearing bar or rod is formed of independent construction it is possible to provide a bearing the periphery of which is smooth and continuous therearound and which will in effect constitute an anti-friction bearing for the operating parts of the hook.

The tongue is formed preferably of a single sheet of metal and comprises a body part 9 having side ears 10 bent downwardly therefrom adapted to engage over opposite sides of the body part of the hook and having an offset end portion 11 adapted to rest upon the upper surface of said body part adjacent the raised shoulder 2ª, and said upright portion forming itself a shoulder of a height somewhat in excess to the height of the shoulder 2ª whereby to assist in the operation of the tongue. Projecting from the lower end of the upright portion 11 of the tongue member is a lip 12 having an opening 13 therethrough which said lip is adapted to be bent around the bearing bar 8 previously described, and which said lip when the tongue is in position constitutes the retaining means for said bearing bar.

Conveniently a spring of U-shape construction is interposed between the tongue and body part of the hook, the elongated member 14 of the spring being adapted to engage the under surface of the tongue between the side ears of the latter whereas the bend of the spring 14ª will engage around the bearing bar and rest within the space formed by the opening 13 of the tongue. The heel 14ᵇ of the spring has an offset terminal 14ᶜ adapted to engage over the shoulder formed between the recesses 5 and 6 in the inner surface of the body part of the hook the said terminal 14ᶜ of the spring lying within the said recess 6.

From the above description it will be appreciated that the bearing bar or rod 8, since it is loosely mounted in position constitutes in effect an anti-friction bearing for both the spring and the tongue member. Again the bearing bar itself can be readily removed and replaced, and the same may be formed of hardened metal or of material different from the other portions of the hook. Further it is possible to give the bar a more continuous and smooth surface bearing for the spring and tongue than is possible where the bearing bar is cast integral with the body part. It is also found in practice that the particular form of bearing bar extends the life of the spring, and renders the various parts of the hook more durable, as well as cheapens the cost of production.

In assembling, the bearing bar 8 is placed in the seat afforded by the recesses 7, and the spring may be applied about the bearing bar either before or after the same is positioned upon the hook, and in this connection it will be appreciated that the spring member may be quite readily applied together with the bearing bar. When the bearing bar and spring are in position the tongue member is positioned upon the hook with the forward end thereof engaging within the recess 3ª at the end of the hook, and with the tail or lip 12 of the tongue projecting through the opening 4 of the body part of the hook to the rear of the bearing 8, whereupon the said tail or lip 12 of the tongue is bent by slight pressure being applied thereto so as to overlie the spring and bearing. The opening 13 in the tongue prevents any undue binding of the bend of the spring against the surface of the tongue in the operation of these parts.

It is obvious of course that the tail or lip of the tongue may be bent rearwardly instead of forwardly, and such a change in the construction is illustrated in Fig. 6, in which the hook member proper indicated by the numeral 15 is provided with a transversely extending slot or a recess 15ª in its rear surface for the reception of the bar 8, and a cut out portion 15ᵇ adapted for the reception of the projecting end of the tail piece or lip 16ª of the tongue 16 in the swinging movement of the latter. The said tail piece passes forwardly over and under the bar as shown to a point to the rear thereof. Also it is to be borne in mind that the tail piece or lip of the tongue may be solid, and a groove or recess for the reception of the bend of the spring provided in either the solid lip of the tongue or in the pivot bar itself. In Figs. 7 and 8 I disclose the tongue, indicated by the numeral 17 as having a solid lip portion 17ª with a groove or recess 17ᵇ therein, while in Figs. 9 and 10 the bar itself is provided with such a groove or recess. In either case the groove or recess is of sufficient width and depth to accommodate the spring, and thereby prevent undue binding tendency of the latter. In Fig. 10 the pivot bar is shown as being round in cross section and provided with the groove 18, while in Fig. 9 the bar is shown as having squared ends 18ª with the groove 18ᵇ. In the form of bar illustrated in Fig. 9 it will be noted that the squared ends thereof when in position in the recess of the hook member proper will be held in place, and this structure is of advantage when it is desired to form the bearing bar of independent material, for instance relatively hardened metal, and at the same time to prevent rotary movement of the same if desired.

What I claim is:

1. In a snap hook, the combination with a body part having a hook member and a pintle seat, of a tongue member engaging the hook and having a pintle engaging part, and a detached pintle loosely positioned in the seat of the body part and held in position by the pintle engaging part of the tongue and spring retaining means interposed between the tongue and hook member.

2. In a snap hook, the combination of a body part having a hook member and a pintle seat in its rear surface, of a tongue member engaging the hook and having a pintle engaging part, and a detached pintle having enlarged ends loosely positioned in the pintle seat of the body part and an intermediate spring engaging part, and substantially U-shaped spring mounted at its bend upon its spring engaging part of the pintle with one arm engaging the body part and the other arm engaging the tongue member.

3. In a snap hook, a body part having an opening therethrough adjacent one end and a hook at its opposite end, a spring actuated tongue member overlying the front surface of the body part and adapted at its forward end to engage the hook, a transversely extending bar loosely fitting in a recessed portion of the body part intermediate the front and back of said opening, whereby the bar is bodily removable, the said bar bridging the opening of said body part, and the rear end of the tongue being offset downwardly and of a width to project over the sides of the opening so as to rest on the upper surface of the body part to form an upright wall, and said rear end of the tongue having a portion reduced in width forming a tail piece projecting through said opening and curved about said bar.

4. In a snap hook, a body part having an opening therethrough adjacent one end and a hook at its opposite end, a tongue member overlying the front surface of the body part and adapted at its forward end to engage the hook, a transversely extending bar loosely fitting in a recessed portion of the rear surface of the body part intermediate the front and back of said opening, whereby the bar is bodily removable, the said bar bridging the opening of said body part, and the rear end of the tongue being offset downwardly and of a width to project over the sides of the opening so as to rest on the upper surface of the body part to form an upright wall, and said rear end of the tongue having a portion reduced in width forming a tail piece projecting through said opening and curved about said bar, which said tail piece has a longitudinal cut out portion, and a substantially U-shaped spring mounted at its bend on said bar and in the cut out portion of said tail piece, with the opposite arms of the spring projecting through the opening of the body part and engaging one arm, the tongue, and the other the body part.

In testimony whereof I affix my signature in presence of two witnesses.

JOHN BROWN BAXTER.

Witnesses:
GEORGE H. LEE,
JOHN H. HIRST.

---

Copies of this patent may be obtained for five cents each, by addressing the "Commissioner of Patents, Washington, D. C."